United States Patent [19]

Quinter

[11] 4,198,038

[45] Apr. 15, 1980

[54] DEVICE FOR CLAMPING A WORKPIECE TO A SUPPORTING SURFACE

[75] Inventor: Wilfred C. Quinter, Dayton, Ohio

[73] Assignee: T. E. Co., Englewood, Ohio

[21] Appl. No.: 935,462

[22] Filed: Aug. 21, 1978

[51] Int. Cl.² .............................................. B23Q 3/02
[52] U.S. Cl. ..................................... 269/137; 269/241; 269/282
[58] Field of Search .................. 269/101, 91, 134–138, 269/241, 282

[56] References Cited

U.S. PATENT DOCUMENTS

| | | | |
|---|---|---|---|
| 1,823,537 | 9/1931 | Gaudreau | 269/241 |
| 1,938,337 | 12/1933 | Janiskewski | 269/136 |
| 2,637,249 | 5/1953 | Swenson | 269/134 |
| 2,691,212 | 10/1954 | Hildebrand | 269/137 |
| 3,506,253 | 4/1970 | Swenson | 269/137 |

*Primary Examiner*—Robert C. Watson
*Attorney, Agent, or Firm*—Jacox & Meckstroth

[57] ABSTRACT

A workpiece is held to a supporting surface by a clamp device including a body which is secured to the surface and has a laterally extending inclined slot within its forward end surface. A gripping element is supported for sliding movement within the slot and is retained therein by a screw mechanism which is aligned with the slot and also provides for moving the gripping element within the slot.

6 Claims, 4 Drawing Figures

U.S. Patent Apr. 15, 1980 4,198,038
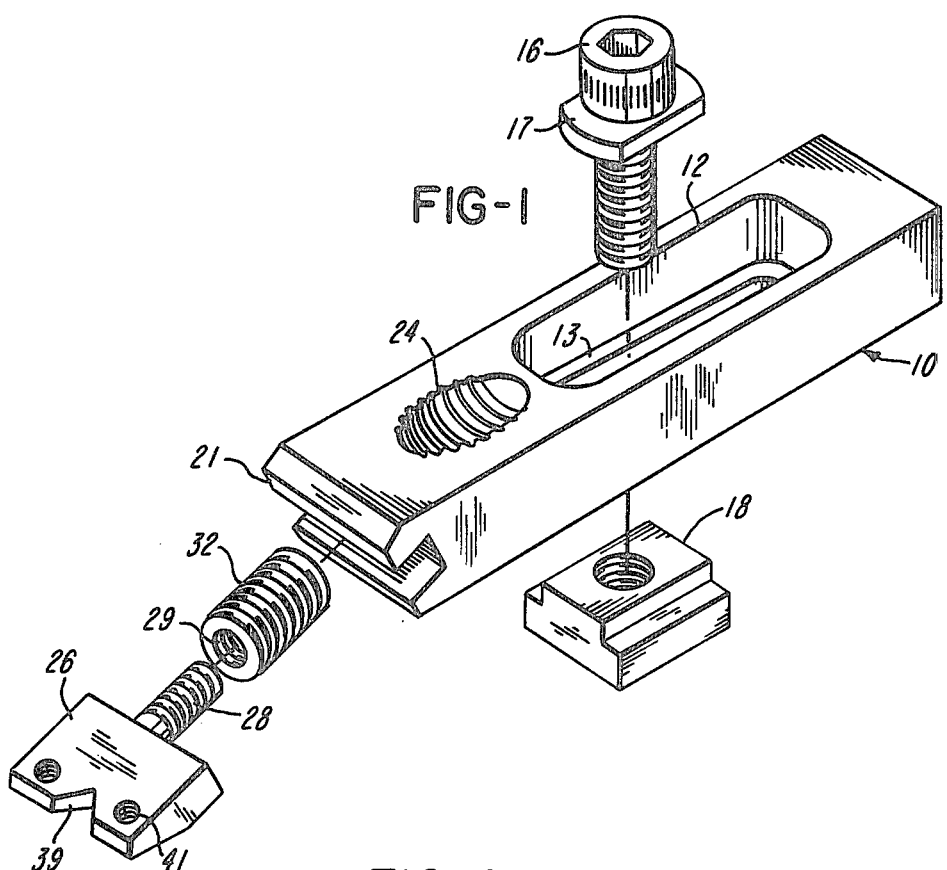
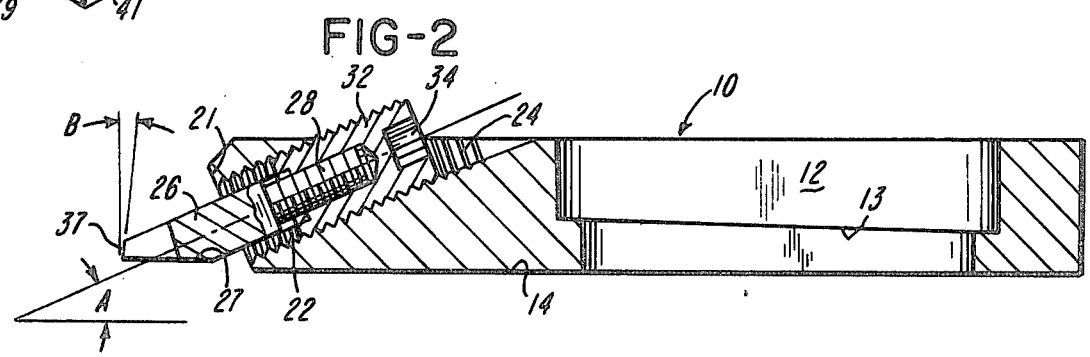
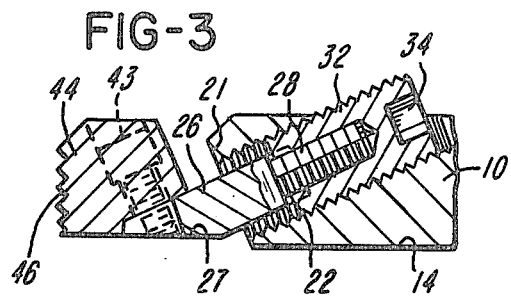 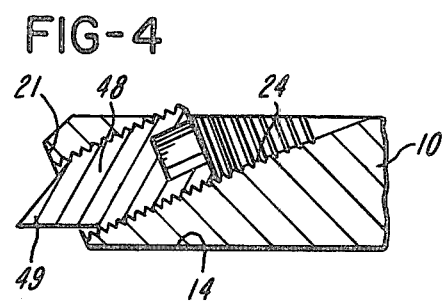

DEVICE FOR CLAMPING A WORKPIECE TO A SUPPORTING SURFACE

BACKGROUND OF THE INVENTION

In the art of machine tools, it is common to utilize a workpiece support table or surface which is interrupted by parallel spaced slots each having an inverted T-shaped configuration. The workpiece is clamped to the surface by one or more bar-like clamping devices such as, for example, disclosed in U.S. Pat. No. 3,451,668. The bar clamps are secured to the supporting surface by threaded fasteners which connect with T-nuts positioned within the slots as shown in the above patent. Frequently, it is desirable to clamp a workpiece to a supporting surface by engaging only edge surfaces of the workpiece with adjustable jaw clamps having a low profile so that the clamps do not project substantially from the supporting surface and do not interfere with the operation to be performed on the workpiece.

One form of adjustable jaw workpiece clamp is disclosed in U.S. Pat. No. 3,506,253 and incorporates a screw projecting through an inclined hole within an adjustable jaw. The screw is threaded into an aligned hole within a nut member adapted to be received within a T-slot. Another form of adjustable jaw clamp incorporates a clamping plate or bar having a sloping or inclined forward surface with a dovetail guide which receives a jaw element. The jaw element is adjusted along the inclined dovetail guide by rotating an adjustment screw captured between the jaw and the dovetail guide. Such a clamping device is manufactured and sold by J & S Tool Co., Inc., Livingston, N.J. Another form of a device for gripping and holding an edge surface of a workpiece is disclosed in U.S. Pat. No. 1,938,337 wherein a workpiece gripping element is slidably supported within a slightly inclined slot formed within a clamp body, and a horizontal adjustment screw is rotated for moving the gripping element within the slot.

SUMMARY OF THE INVENTION

The present invention is directed to an improved workpiece hold-down or clamping device which provides for positively gripping a workpiece at an angle which assures dependable and rigid securing of the workpiece to its supporting surface. The device is also adapted for simplified manufacturing and assembly, is convenient to use, and provides for flexibility in using different adjustable gripping elements according to the configuration of the workpiece.

Other features and advantages of the invention will be apparent from the following description, the accompanying drawings and the appended claims.

BRIEF DESCRIPTION OF THE DRAWINGS

FIG. 1 is an exploded perspective view of a workpiece clamping device constructed in accordance with the invention;

FIG. 2 is a vertical section of an assembled clamping device as shown in FIG. 1 and taken generally on the longitudinal centerline of the device;

FIG. 3 is a fragmentary section similar to FIG. 2 and showing the addition of an enlarged head for gripping a workpiece; and FIG. 4 is a fragmentary section similar to FIG. 3 and showing a modified workpiece clamping device constructed in accordance with the invention.

DESCRIPTION OF THE PREFERRED EMBODIMENTS

Referring to FIGS. 1 and 2, a workpiece clamping device constructed in accordance with the invention includes an elongated rectangular bar-like body 10 having a longitudinally extending slot 12. The slot 12 is partially defined by a peripherally extending internal step or shoulder 13 and preferably, the shoulder 13 slopes longitudinally at a slight angle of approximately 1½ degrees relative to the flat bottom surface 14 of the body 10, as shown in FIG. 2. The slot 12 is adapted to receive a threaded fastener such as a cap screw 16 which extends through a flat generally rectangular washer 17 adapted to seat on the shoulder 13. In a conventional manner, the screw 16 is threaded into a T-nut 18 which is positioned within a T-slot formed within the surface supporting the clamp body 10.

The clamp body 10 has an inclined forward end surface 21 which is interrupted by a laterally extending slot 22. The slot 22 projects normally to the surface 21 and is inclined on an angle A (FIG. 2) of approximately 25° relative to the bottom surface 14 of the clamp body 10. A threaded hole 24 is aligned with the slot 22 (FIG. 2) and extends from the slot on the same inclined angle upwardly through the forward end portion of the clamp body 10 to the top surface of the body.

A generally flat workpiece gripping element 26 is supported within the slot 22 for sliding movement on the axis of the slot and threaded hole 24 and has a flat bottom surface 27 which extends parallel to the bottom surface 14 of the clamp body 10. The gripping element 26 also includes an integrally formed threaded stud 28. The stud 28 is received within a mating threaded hole 29 formed within the center of an adjustment screw 32 which is threaded into the hole 24. The adjusting screw 32 has an upper end or head portion with a hexagonal socket 34 which is adapted to receive an "Allen" wrench to provide for rotating the screw 32 within the hole 24.

Preferably, the external threads on the screw 32 and the mating threads within the hole 24 are right-hand threads, and the external threads on the stud 28 and the mating threads within the hole 29 are left-hand threads so that axial movement of the gripping element 26 within the slot 22 is faster than the axial movement of the screw 32 within the hole 24 when the screw 32 is rotated. For example, the external threads on the screw 32 have a pitch of 2 millimeters, and the external threads on the stud 28 have a pitch of 1.25 millimeters. Thus one revolution of the adjusting screw 32 produces a travel of the gripping element 26 within the slot 22 of 3.25 millimeters.

As shown in FIG. 2, the gripping element 26 has a forward end or edge surface 37 which is preferably inclined at a slight angle B of approximately 1½ degrees relative to a plane perpendicular to the bottom surface 27 of the gripping element. The edge surface 37 is interrupted by a V-shaped center notch 39 which extends between a pair of threaded holes 41 and is used for gripping a rounded surface on a workpiece. As illustrated in FIG. 3, the holes 41 are adapted to receive corresponding cap screws 43 which extend through counterbored holes within an attachment gripping head or jaw 44 for securing the jaw to the gripping element 26. The attachment jaw 44 has a larger knurled-type front surface 46 for gripping a workpiece and may be machined from brass.

Referring to FIG. 4, the gripping element 26 and its retaining and adjusting screw 32 may be removed from the clamp body 10 and be replaced by a socket head gripping screw 48 which is threaded into the hole 24 and has a pointed nose or end portion 49. The pointed nose gripping screw 48 is used for positively securing a small or unusually shaped workpiece to its supporting surface when the gripping element 26 or jaw 44 would be too large or produce an interference.

From the drawing and the above description, it is apparent that a clamp device constructed in accordance with the present invention provides desirable features and advantages. For example, it is apparent that the adjusting screw 32 provides for not only quickly and conveniently adjusting the workpiece gripping element 26, but also serves to retain the gripping element within the slot 22. As a result, the construction and assembly of the clamp device is simplified, and the clamp device is adapted for more efficient and economical manufacture. As another feature, the reversed threads on the adjusting screw 32 and the stud 28 provide for quickly adjusting the gripping element 26 in response to rotation of the screw 32 so that a workpiece may be rapidly gripped and released. The inclined angle A of approximately 25 degrees also provides a desirable angle for engaging and gripping most workpieces. As mentioned above, it is also convenient to remove the screw 32 from the hole 24 in order to insert the pointed nose gripping screw 48 (FIG. 4) when a pointed nose is desirable because of the shape or contour of the workpiece.

While the form of apparatus herein described constitutes a preferred embodiment of the invention, it is to be understood that the invention is not limited to this precise form of apparatus, and that changes may be made therein without departing from the scope and spirit of the invention as defined in the appended claims.

I claim:

1. A clamp device adapted for holding a workpiece on a supporting surface, said device comprising an elongated single-piece clamp body having a top surface, a forward end surface and a bottom surface for engaging the supporting surface, means defining a longitudinally extending slot within said clamp body between said top and bottom surfaces, a threaded fastener extending through said slot for securing said body to the supporting surface, means defining a laterally extending cross slot within said forward end surface of said clamp body, said cross slot being inclined upwardly from said forward end surface and forming an acute angle with said bottom surface, a generally flat workpiece gripping element supported within said cross slot for sliding movement and projecting downwardly from said forward end surface at an acute angle relative to said bottom surface, means defining an inclined threaded hole within said body and extending upwardly from said laterally extending slot in alignment therewith to said top surface of said clamp between said forward end surface and said longitudinally extending slot, an adjusting screw extending within said threaded hole, means connecting said adjusting screw to said gripping element to effect movement of said gripping element within said cross slot in response to rotation of said screw, and means for retaining said gripping element within said cross slot.

2. A clamp device as defined in claim 1 wherein said means connecting said adjusting screw to said gripping element comprise a non-rotatable threaded stud projecting upwardly and rearwardly from said gripping element in alignment with said cross slot.

3. A clamp device as defined in claim 2 wherein said threaded stud is an integral part of said gripping element.

4. A clamp device as defined in claim 1 wherein said forward end surface of said clamp body extends substantially perpendicular to the axis of said threaded hole.

5. A clamp device as defined in claim 1 including an attachable block-like jaw member, and means releasably securing said jaw member to said gripping element.

6. A clamp device as defined in claim 1 wherein the axis of said inclined threaded hole and said laterally extending inclined slot form an angle of approximately twenty five degrees relative to said bottom surface of said clamp body.

* * * * *